(12) United States Patent
Huang

(10) Patent No.: US 11,440,215 B1
(45) Date of Patent: Sep. 13, 2022

(54) METHOD OF MAKING WOODEN BOARD ASSEMBLY

(71) Applicant: Juan Wood Building Materials Co., Ltd., Changhua County (TW)

(72) Inventor: Yu-Che Huang, Changhua (TW)

(73) Assignee: Juan Wood Building Materials Co., Ltd., Lukang Township (TW)

(*) Notice: Subject to any disclaimer, the term of this patent is extended or adjusted under 35 U.S.C. 154(b) by 0 days.

(21) Appl. No.: 17/193,112

(22) Filed: Mar. 5, 2021

(51) Int. Cl.
| | |
|---|---|
| *B27M 1/08* | (2006.01) |
| *B32B 21/00* | (2006.01) |
| *B32B 5/00* | (2006.01) |
| *B32B 7/00* | (2019.01) |
| *B27D 5/00* | (2006.01) |
| *B32B 38/00* | (2006.01) |
| *B32B 21/10* | (2006.01) |
| *B32B 5/02* | (2006.01) |
| *B32B 7/12* | (2006.01) |
| *B32B 21/14* | (2006.01) |

(52) U.S. Cl.
CPC ............. *B27M 1/08* (2013.01); *B27D 5/00* (2013.01); *B32B 5/022* (2013.01); *B32B 7/12* (2013.01); *B32B 21/10* (2013.01); *B32B 21/14* (2013.01); *B32B 38/0004* (2013.01); *B32B 2479/00* (2013.01); *B32B 2607/00* (2013.01); *Y10T 156/108* (2015.01); *Y10T 156/1059* (2015.01); *Y10T 156/1075* (2015.01); *Y10T 156/1089* (2015.01); *Y10T 156/1092* (2015.01); *Y10T 156/1093* (2015.01); *Y10T 156/1095* (2015.01)

(58) Field of Classification Search
None
See application file for complete search history.

(56) References Cited

U.S. PATENT DOCUMENTS

| | | | | |
|---|---|---|---|---|
| 2,522,807 A | * | 9/1950 | Woolums | E04C 2/40 156/229 |
| 3,155,558 A | * | 11/1964 | Clapp | B27G 1/00 156/94 |
| 3,188,804 A | * | 6/1965 | Alden | F23R 3/48 60/248 |
| 3,580,760 A | * | 5/1971 | Koch | B27D 1/04 156/64 |
| 3,961,654 A | * | 6/1976 | Hasenwinkle | B27B 1/005 144/348 |

(Continued)

*Primary Examiner* — Linda L Gray
(74) *Attorney, Agent, or Firm* — Karin L. Williams; Alan D. Kamrath; Mayer & Williams PC

(57) ABSTRACT

A method of making a wooden board assembly includes A) determining a scrap portion of a trunk; B) cutting the trunk horizontally to form multiple boards; C) removing narrow scraps and trimmed sections of each of the multiple boards to obtain multiple trimmed wide boards, and cutting narrow board areas from the scrap portion to form multiple peripheral boards; D) removing a part of the scrap portion and two trimmed sections from each of the multiple peripheral boards; E) connecting the multiple trimmed wide boards and the multiple peripheral boards to form a substrate; F) adhering two straps on the substrate to produce a wood pattern assembly; G) cutting the wood pattern assembly to form multiple cut films; H) adhering one of the multiple cut films with a nonwoven fabric with a transparent adhesive and connecting the multiple cut films on a fixing lamination; and I) cutting the fixing lamination.

1 Claim, 8 Drawing Sheets

(56) References Cited

U.S. PATENT DOCUMENTS

| | | | | |
|---|---|---|---|---|
| 3,977,449 A * | 8/1976 | Sadashige | B27B 1/00 | 144/351 |
| 3,989,078 A * | 11/1976 | Hasenwinkle | B27B 1/005 | 144/351 |
| 4,111,247 A * | 9/1978 | Hasenwinkle | B27B 1/005 | 144/351 |
| 4,262,717 A * | 4/1981 | Kohn | B27M 3/0053 | 144/350 |
| 4,691,751 A * | 9/1987 | Komulainen | B23D 59/008 | 144/1.1 |
| 5,299,400 A * | 4/1994 | Sing | B27M 3/0053 | 144/340 |
| 5,332,461 A * | 7/1994 | Huesler | A47C 23/061 | 156/252 |
| 5,543,193 A * | 8/1996 | Tesch | B29B 17/0026 | 428/68 |
| 5,618,371 A * | 4/1997 | Sing | B27B 1/00 | 144/345 |
| 5,881,785 A * | 3/1999 | Minardi | B23Q 3/005 | 144/253.2 |
| 5,896,723 A * | 4/1999 | Sing | E04C 3/29 | 52/847 |
| 6,164,027 A * | 12/2000 | Ohlund | B27B 1/00 | 144/347 |
| 6,224,704 B1 * | 5/2001 | Bassett | E04C 3/14 | 156/182 |
| 6,321,803 B1 * | 11/2001 | Nien | B32B 3/14 | 144/329 |
| 6,576,079 B1 * | 6/2003 | Kai | B27L 5/00 | 144/346 |
| 6,648,037 B2 * | 11/2003 | Chaisang | B27B 1/00 | 144/346 |
| 6,761,009 B1 * | 7/2004 | Karlstrom | B27M 3/0053 | 52/847 |
| 6,824,851 B1 * | 11/2004 | Locher | B29C 69/001 | 428/76 |
| 6,960,277 B2 * | 11/2005 | Brunet | B27M 1/08 | 144/347 |
| 7,004,215 B2 * | 2/2006 | Knokey | B27M 1/08 | 144/348 |
| 2006/0048852 A1 * | 3/2006 | McIntosh | B27M 1/02 | 144/380 |
| 2006/0054267 A1 * | 3/2006 | Bosson | E04C 3/122 | 156/64 |
| 2006/0076083 A1 * | 4/2006 | Lindblom | B27M 1/08 | 144/368 |
| 2013/0115412 A1 * | 5/2013 | Padmanabhan | B29C 70/521 | 428/113 |
| 2013/0183477 A1 * | 7/2013 | Leitinger | B27M 3/0053 | 428/58 |

* cited by examiner

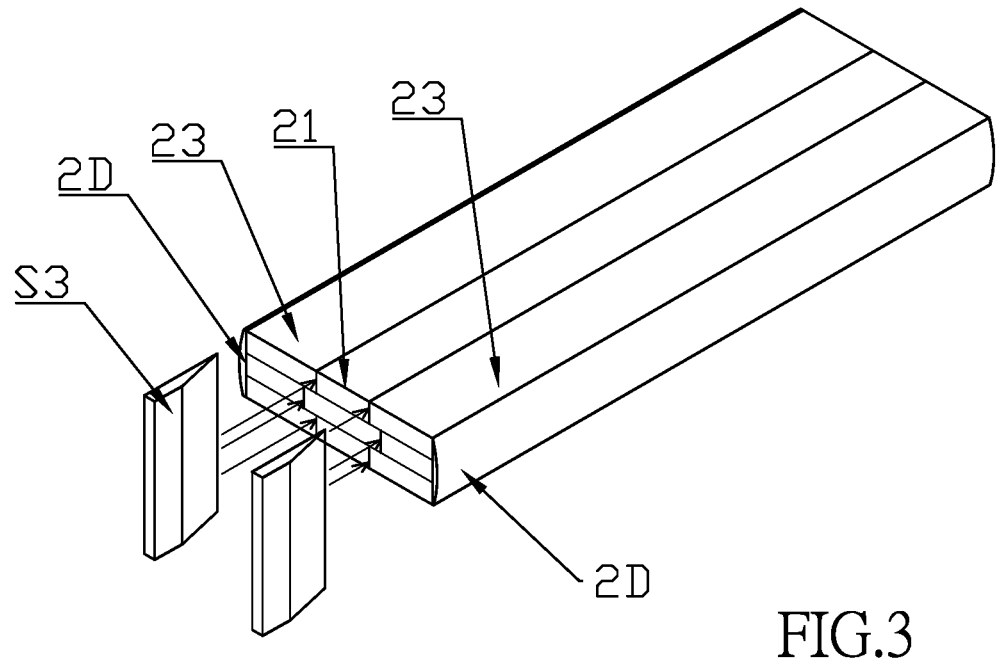
FIG.3
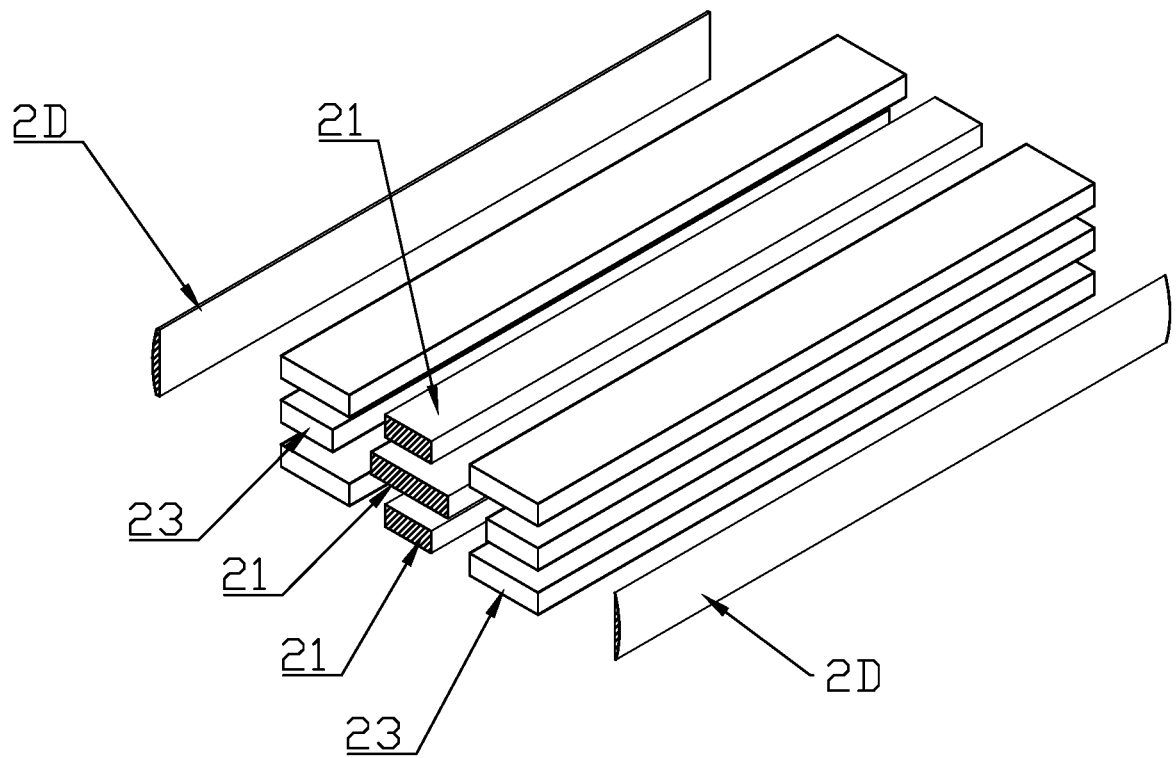

METHOD OF MAKING WOODEN BOARD ASSEMBLY

FIELD OF THE INVENTION

The present invention relates to a method of making a wooden board assembly which is enhances an aesthetic appearance of the wooden board assembly.

BACKGROUND OF THE INVENTION

Wooden materials or boards for wall panels or furniture in a building can not only bring warm color texture, but can also have the natural fragrance of a woody fragrance. Thus, wooden materials or boards are the most advanced and expensive decoration material.

However, the growth rate of trees is slow. If a large amount of solid wood (such as fir, pine, etc.) is used, excessive felling will damage the earth's environment. Because solid wood with a sufficient area and thickness is not easy to obtain, the price is relatively expensive and it will be difficult to obtain the solid wood. Also, cutting trees excessively will cause damage to nature. Therefore, there are many alternative products on the market to replace solid wooden material or boards, such as plywood or foam board.

The outer layer of the plywood or foamed board is pasted with a wooden texture veneer, but aforementioned veneer is printed by a printing machine, and the repeatability of the texture is high, which is quite unnatural when used in decoration. Moreover, the printed lamination lacks the multiple functions of the log material that can absorb infrared rays, ultraviolet rays, and emit natural warm colors and natural log aroma.

In order to solve this problem, some manufacturers have developed wooden board assemblies to obtain natural veneer through string cutting, rotary cutting, diameter cutting or slitting, and then, through a laminating process, the plywood or the outer layer of the foam board or the top layer of non-woven fabric is made into a paste, thus obtaining a wooden board assembly.

However, the traditional veneer cutting technology fails to consider the material for the growth of the tree material, which leads to scattered and fragmented natural wood grain visual effects of the composite whole surface of the wood grain board, especially when it is a large size. When laying a large area of the board or wall, the aforementioned manufacturing method will have high repeatability of the texture, or the texture of the veneer will be extremely unnatural, and the installation effect of the natural wood will be lost.

It is possible to adhere the technical veneer on a plywood or stiff material, but this technical veneer requires pre-treatment before lamination. Not only is the procedure cumbersome, but also the cost is higher. Also, it is also thicker and heavier than natural veneer, and it is more labor-intensive during paving and construction.

The present invention has arisen to mitigate and/or obviate the afore-described disadvantages.

SUMMARY OF THE INVENTION

The primary objective of the present invention is to provide a method of making a wooden board assembly which is capable of enhancing an aesthetic appearance of the wooden board assembly.

The secondary objective of the present invention is to provide a method of making a wooden board assembly which has enhanced efficiency by using a trunk and simplifying the manufacture process of the wooden board assembly.

A further objective of the present invention is to provide a method of making a wooden board assembly which is capable of enhancing productivity of the wooden board assembly.

Another objective of the present invention is to provide a method of making a wooden board assembly which is capable of expanding usage of the wooden board assembly to a wall, a curtain, furniture, or equipment.

To obtain above-mentioned objectives, a method of making a wooden board assembly provided by the present invention includes the steps of:

A) determining a scrap portion on a center of a trunk, wherein the scrap portion is rectangular or circular, the trunk includes two wide board areas located on an upper end and a lower end of the scrap portion, and the trunk includes two narrow board areas located on a left side and a right side of the scrap portion;

B) cutting the trunk horizontally in a predetermined thickness to form multiple boards, wherein the multiple boards includes multiple wide boards, multiple narrow scraps;

C) removing multiple narrow scraps and two trimmed sections of the multiple boards to obtain the multiple wide boards;

D) removing a part of the scrap portion and two trimmed sections from a respective peripheral board of multiple peripheral boards;

E) connecting the multiple wide boards and the multiple peripheral boards to form a substrate, wherein a respective wide board and the multiple peripheral boards are cut in a same length and different widths;

F) adhering two straps on two ends of the substrate to produce a wood pattern assembly;

G) cutting the wood pattern assembly in a horizontal cutting manner to form multiple cut films;

H) adhering a respective cut film with a nonwoven fabric by using a transparent adhesive and connecting the multiple cut films on a fixing lamination; and I) cutting the fixing lamination in a desired length and a desired width.

BRIEF DESCRIPTION OF THE DRAWINGS

FIG. 3 is another perspective view of showing a step of making the wooden board assembly according to the preferred embodiment of the present invention.

DETAILED DESCRIPTION OF THE PREFERRED EMBODIMENTS

Figure 1:
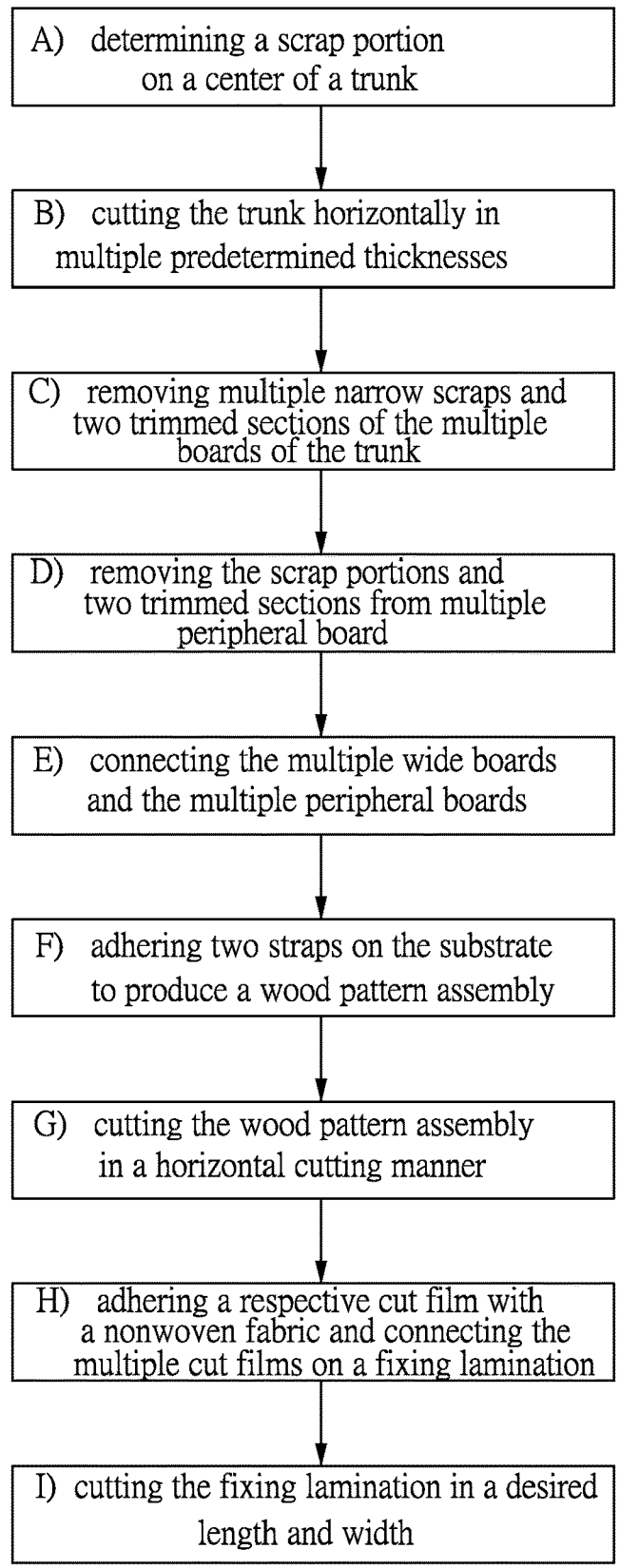
FIG. 1 is a flow chart of a method of making a wooden board assembly according to a preferred embodiment of the present invention.

With reference to FIG. 1, a method of making a wooden board assembly according to a preferred embodiment of the present invention comprises steps of:

A) determining a scrap portion on a center of a trunk;

B) cutting the trunk horizontally in a predetermined thickness to form multiple boards, wherein the multiple boards includes multiple wide boards and multiple narrow scraps;

C) removing multiple narrow scraps and two trimmed sections of the multiple boards to obtain the multiple wide boards;

D) removing a part of the scrap portion and two trimmed sections from a respective peripheral board of multiple peripheral boards;

E) connecting the multiple wide boards and the multiple peripheral boards to form a substrate;

F) adhering two straps on two ends of the substrate to produce a wood pattern assembly;

G) connecting multiple cut films onto the wood pattern assembly;

H) adhering a respective cut film with a nonwoven fabric 5 by using a transparent adhesive and connecting the multiple cut films on a fixing lamination; and I) cutting the fixing lamination in a desired length and a desired width.

Preferably, a simulated pattern film 7 is adhered on the fixing lamination 6 to obtain various patterns, thus enhancing aesthetic appearance.

Figure 2:
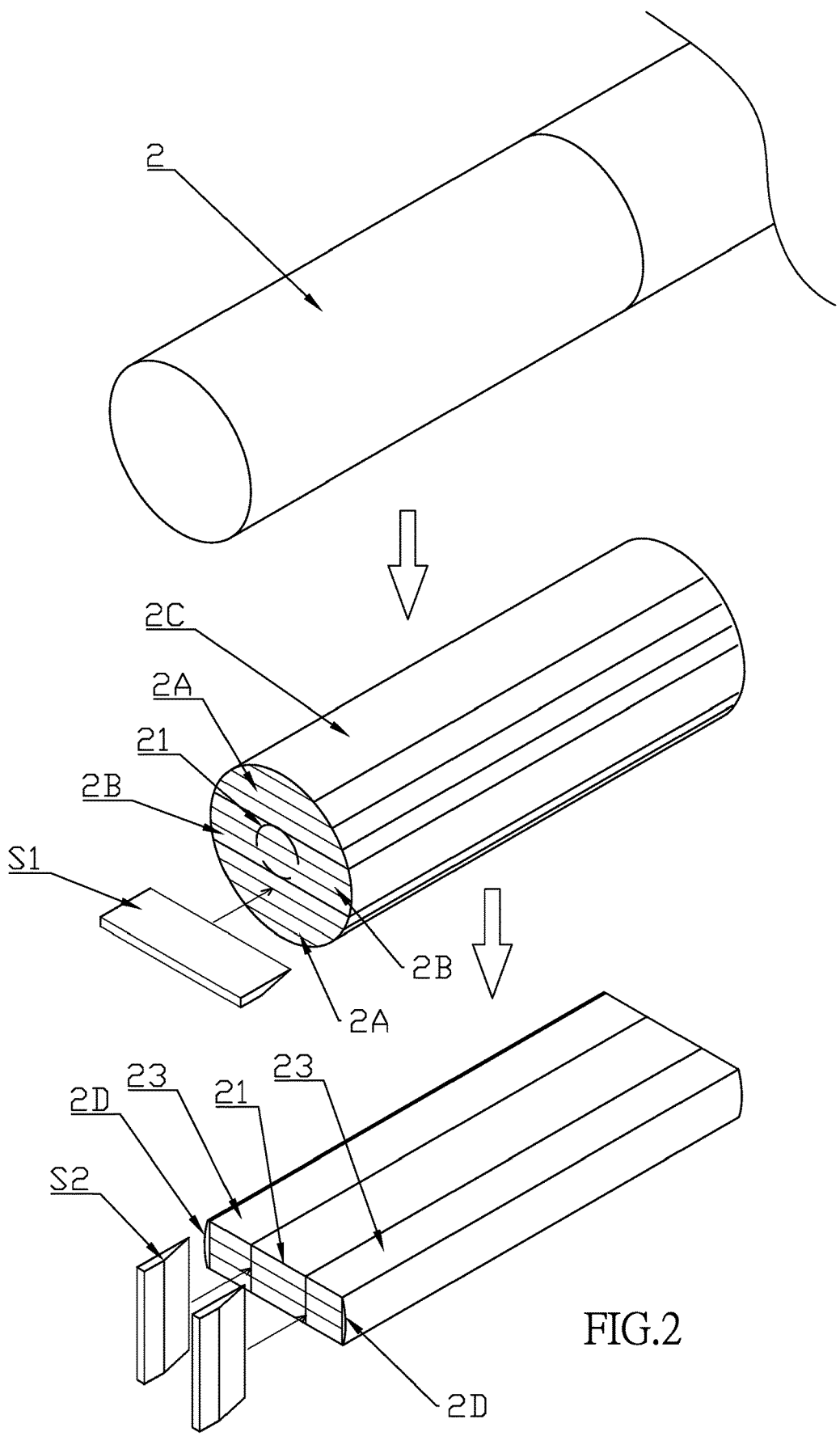
FIG. 2 is a perspective view of showing a step of making the wooden board assembly according to the preferred embodiment of the present invention.
Figure 4:
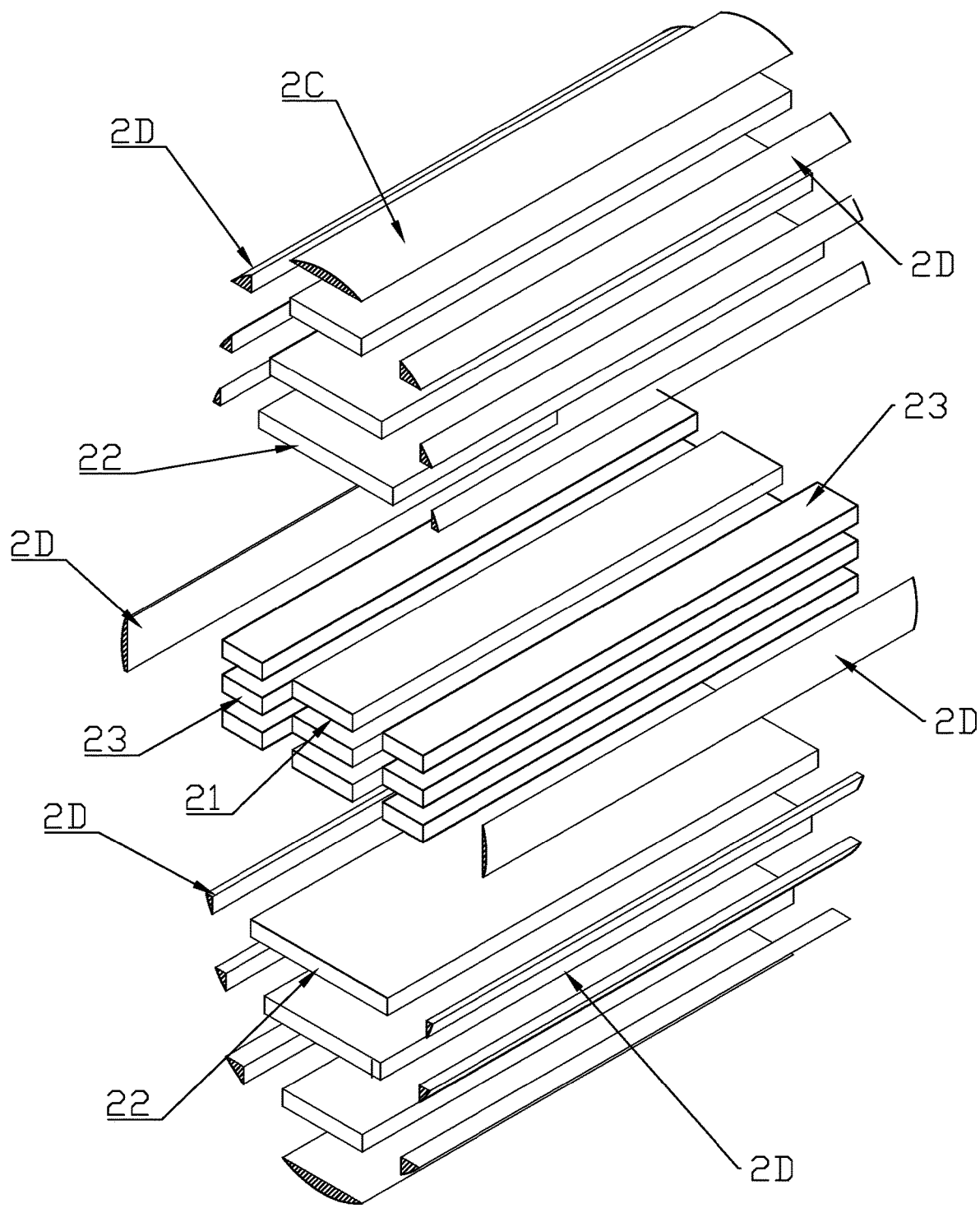
FIG. 4 is also another perspective view of showing a step of making the wooden board assembly according to the preferred embodiment of the present invention.

Referring to FIGS. 2-4, a rectangular or circular scrap portion 21 is determined along a center of a tree ring of the trunk 2 which is placed horizontally, wherein the trunk 2 includes two wide board areas 2A located on an upper end and a lower end of the scrap portion 21, and the trunk 2 includes two narrow board areas 2B located on a left side and a right side of the scrap portion 21.

The trunk 2 is cut in a predetermined thickness to form multiple boards in a cutting horizontal manner S1, the two wide board areas 2A are removed from multiple narrow scraps 2C, and two trimmed sections 2D of the multiple boards of the trunk 2 are trimmed, thus obtaining multiple wide boards 22. A respective wide board 22 has two planes formed on two side walls thereof.

The scrap portion 21 is cut in a longitudinal vertical cutting manner S2 from a respective narrow board area 2B, and the left side and the right side of the scrap portion 21 are trimmed straightly to form multiple peripheral boards 23.

As shown in FIG. 2, the rectangular scrap portion 21 is cut in the longitudinal cutting manner S1 to simplify a cutting process but produce fewer peripheral boards 23. As illustrated in FIG. 3, the circular scrap portion 21 is cut in a vertical cutting manner S3, wherein the circular scrap portion 21 is cut to produce more peripheral boards 23 with a wider width in a complicate cutting process.

Figure 5:
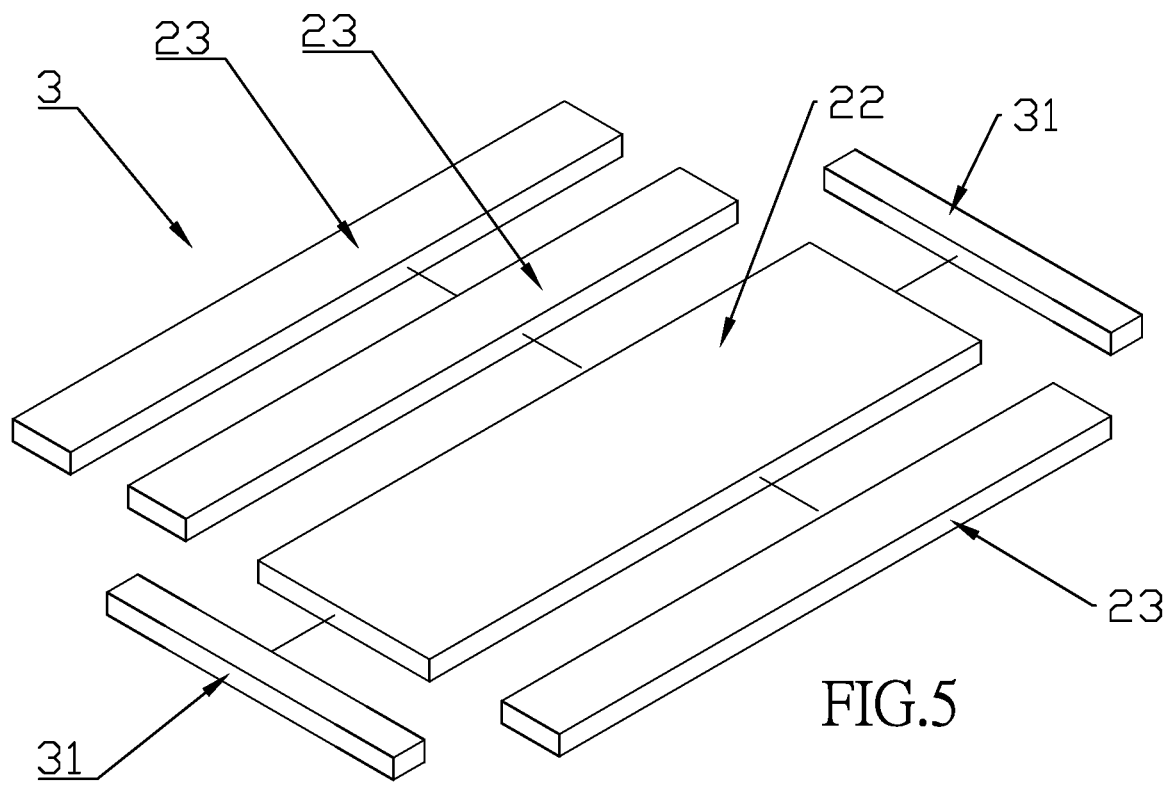
FIG. 5 is still another perspective view of showing a step of making the wooden board assembly according to the preferred embodiment of the present invention.

With reference to FIG. 5, a respective wide board 22 and the multiple peripheral boards 23 are cut in a same length (such as 8 feet, i.e. 245 cm) and different widths, wherein a total width of the respective wide board 22 and the multiple peripheral boards 23 is 4 feet (i.e. 122 cm), then the respective wide board 22 and the multiple peripheral boards 23 are connected so as to produce a substrate 3, wherein a width of the substrate 3 is 4 feet, and a length of the substrate 3 is 8 feet.

Since diameters of various trunks 2 are not equal, widths of multiple scrap portions 21 of the various trunks 2 are not determined accurately, thus producing the multiple wide boards 22 and the multiple peripheral boards 23 with different widths. To solve such a problem, the various trunks 2 of a same species are chosen so that the total length and the total width of the respective wide board 22 and the multiple peripheral boards 23 are more than those of the wood pattern assembly after connecting the respective wide board 22 and the multiple peripheral boards 23.

Preferably, one or multiple wide boards 22 and one or more peripheral boards 23 are connected to form multiple vertical connection patterns.

Furthermore the multiple wide boards 22 or the multiple peripheral boards 23 are connected to obtain different connection patterns.

Figure 6:
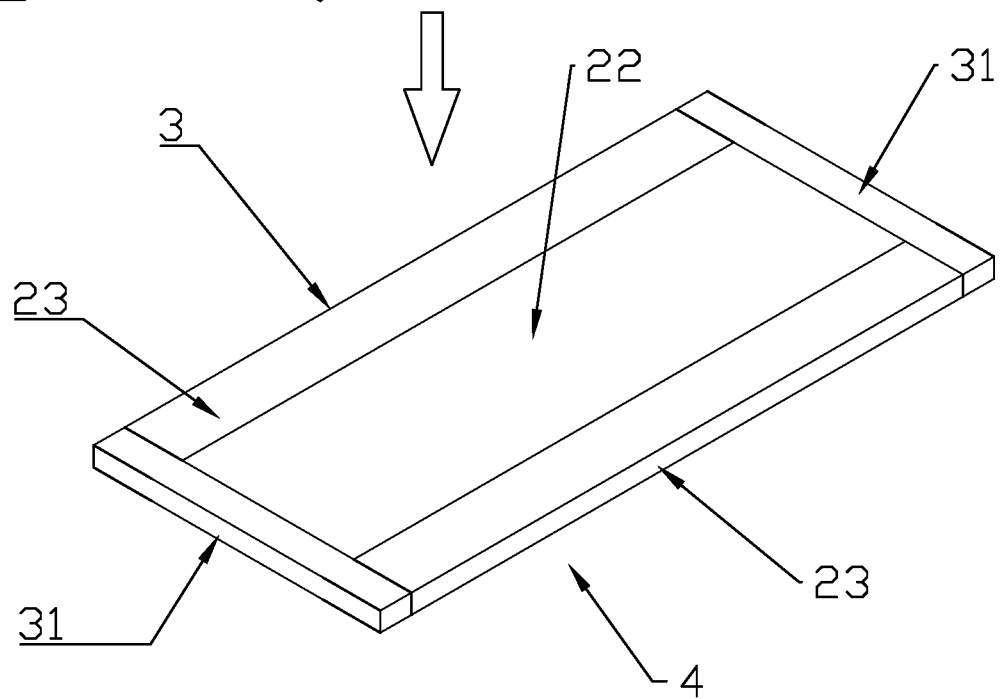
FIG. 6 is another perspective view of showing a step of making the wooden board assembly according to the preferred embodiment of the present invention.

Referring to FIG. 6, two straps 31 are adhered on two ends of the substrate 3 to produce the wood pattern assembly 4, wherein a thickness of the two straps 31 is equal to a thickness of the substrate 3.

Figure 7:
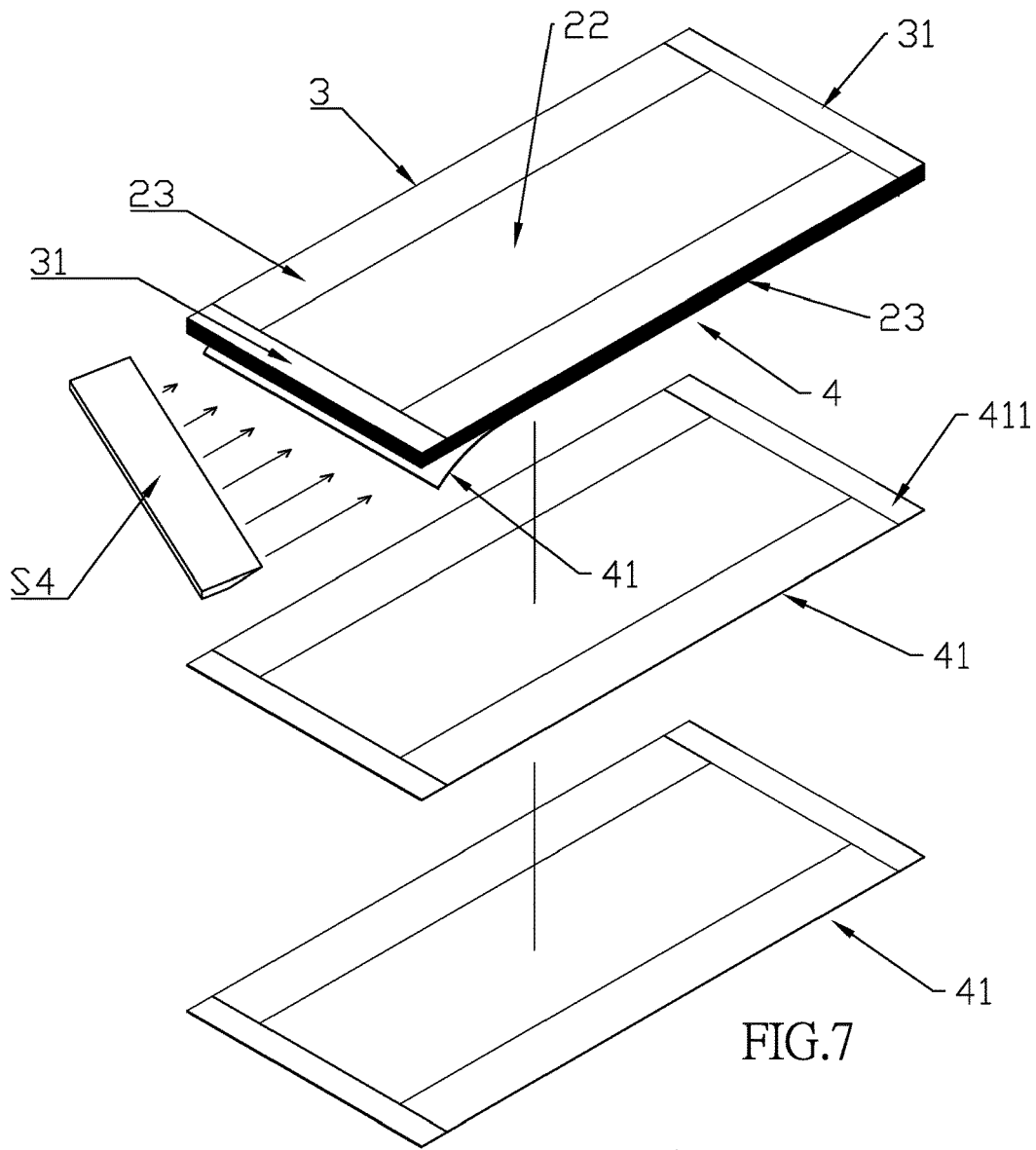
FIG. 7 is also another perspective view of showing a step of making the wooden board assembly according to the preferred embodiment of the present invention.

As shown in FIG. 7, the wood pattern assembly 4 is cut in a horizontal cutting manner S4 to form multiple cut films 41, wherein two coupling sections 411 correspond to and are connected with the two straps 31.

Figure 8:
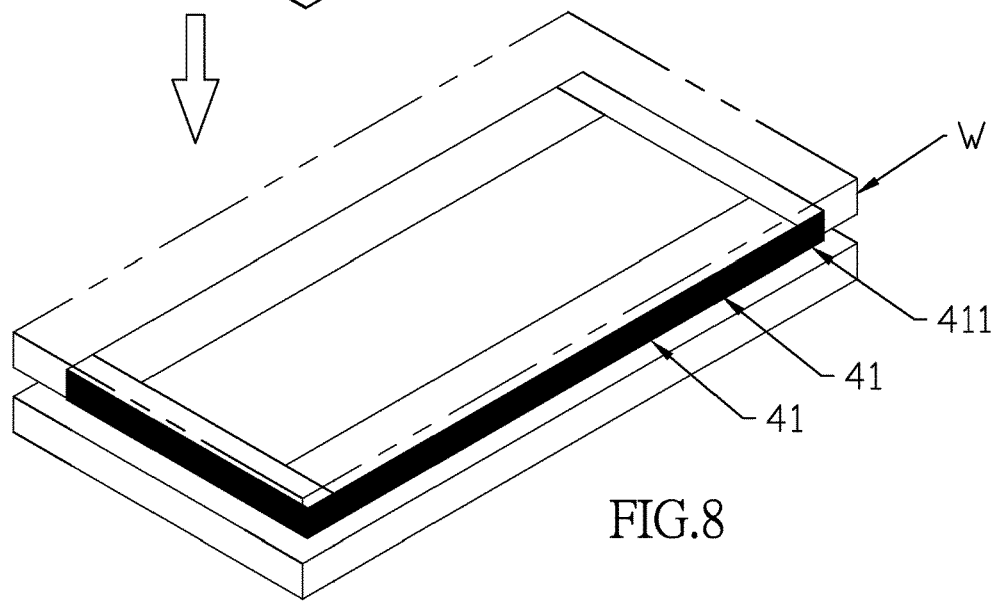
FIG. 8 is still another perspective view of showing a step of making the wooden board assembly according to the preferred embodiment of the present invention.

As illustrated in FIG. 8, the multiple cut films 41 are stacked and then are pressed by a heavy object W.

Figure 9:
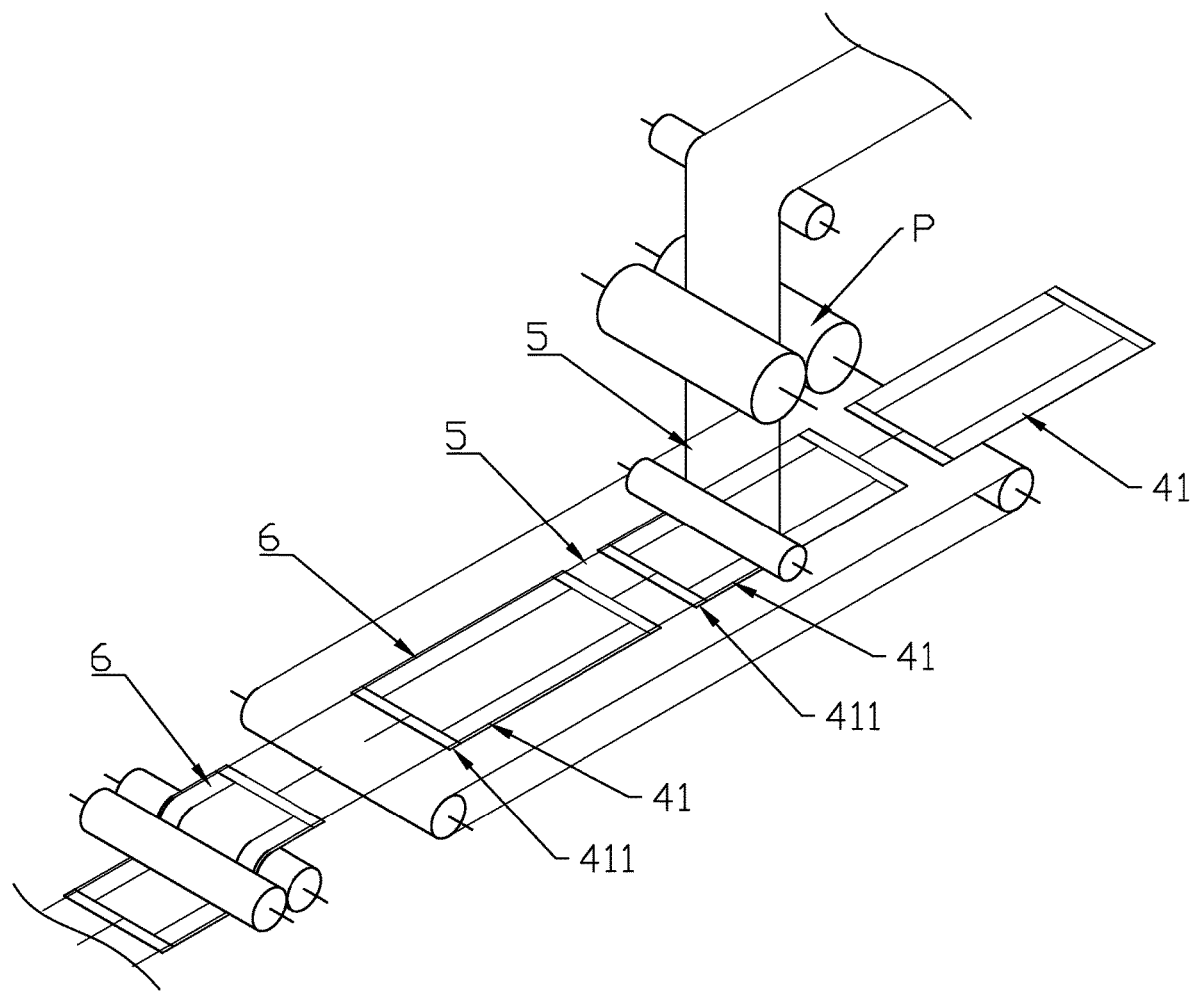
FIG. 9 is another perspective view of showing a step of making the wooden board assembly according to the preferred embodiment of the present invention.

With reference to FIG. 9, a transparent adhesive P is coated on a bottom of a respective cut film 41 so as to adhere with a nonwoven fabric 5, and the multiple cut films 41 are connected on a fixing lamination 6.

Figure 10:
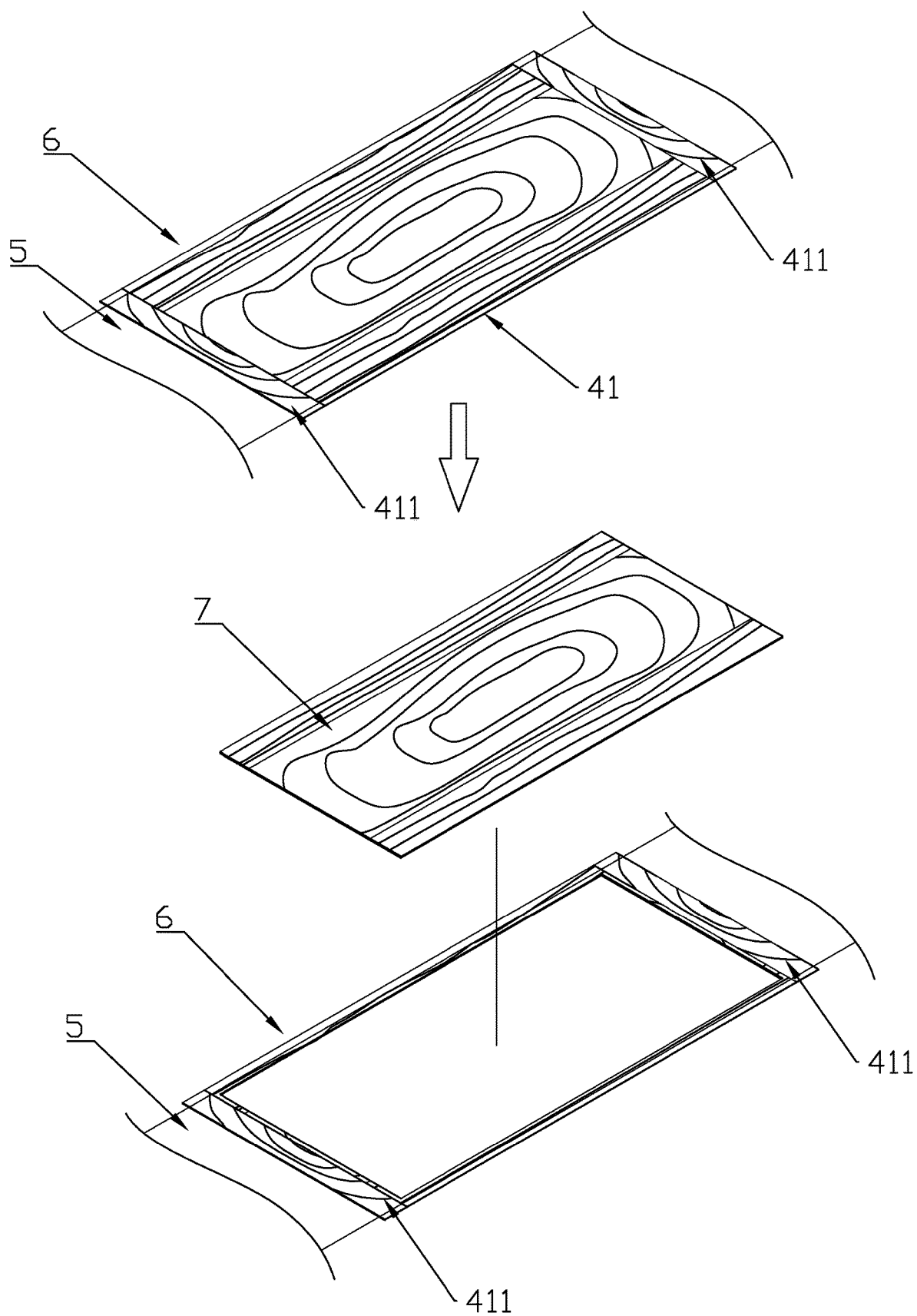
FIG. 10 is also another perspective view of showing a step of making the wooden board assembly according to the preferred embodiment of the present invention.

Referring to FIG. 10, after producing the fixing lamination 6, a simulated pattern film 7 is adhered on the fixing lamination 6 to obtaining various patterns.

The nonwoven fabric 5 is connected on the simulated pattern film 7 so that the simulated pattern film 7 is adhered on a wall, a curtain, furniture, or equipment vividly.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention

What is claimed is:

1. A method of making a wooden board assembly comprising steps of:

A) determining a scrap portion on a center of a tree trunk, wherein the scrap portion is rectangular or circular, the trunk includes two wide board areas located on an upper end and a lower end of the scrap portion, and the trunk includes two narrow board areas located on a left side and a right side of the scrap portion;

B) cutting the trunk horizontally in a predetermined thickness to form multiple boards, wherein the multiple boards include multiple wide boards, a narrow scrap board at a top of the trunk and a narrow scrap board at a bottom of the trunk;

C) removing the narrow scrap boards and two trimmed sections of each of the multiple boards to obtain multiple trimmed wide boards, and cutting each of the narrow board areas from the scrap portion to form multiple peripheral boards;

D) removing a part of the scrap portion and two trimmed sections from each peripheral board of the multiple peripheral boards;

E) connecting each of the multiple trimmed wide boards with multiple peripheral boards to form a substrate, wherein each of the multiple trimmed wide boards and each of the multiple peripheral boards is cut in a same length;

F) adhering two straps on two ends of the substrate to produce a wood pattern assembly;

G) cutting the wood pattern assembly to form multiple cut films;

H) adhering each of the multiple cut films with a nonwoven fabric by using a transparent adhesive and connecting the multiple cut films on a fixing lamination; and I) cutting the fixing lamination in a predetermined length and a predetermined width.

\* \* \* \* \*